UNITED STATES PATENT OFFICE.

RAFAEL HERRERA VEGAS AND MARCELINO HERRERA VEGAS, OF BUENOS AIRES, ARGENTINA.

COLORING PRODUCT AND TINCTORIAL MORDANT.

1,330,992.     Specification of Letters Patent.     Patented Feb. 17, 1920.

No Drawing.     Application filed June 17, 1918. Serial No. 240,389.

*To all whom it may concern:*

Be it known that we, RAFAEL HERRERA VEGAS and MARCELINO HERRERA VEGAS, both citizens of the Argentine Republic, manufacturers, residing at Calle Maipú 671, Buenos Aires, Argentine Republic, have invented a Novel Coloring Product and Tinctorial Mordant, of which the following is a specification.

Our present invention relates to a novel coloring product and tinctorial mordant for other coloring materials which owing to its particular properties may be adapted for industrial purposes as well as for coloring food products.

The said industrial product, while being a powerful mordant and possessing high coloring properties, is entirely innocuous so that it may conveniently be employed as a substitute of saffron in all those uses in which this latter is employed for coloring food products.

In view of the prolific growth of the tree from which the above mentioned product is extracted and to the intensity of its action as a mordant or a coloring material, it is to be presumed that the new product is adapted to advantageously replace most of the products of similar description now being used.

The new product may be employed as a simple mordant in the preparation of textile or of other materials to be dyed or not by the known tinctorial means, and it may also be used as a pigmentary mordant, in order to take advantage of its natural color.

The tree from which we obtain, by any of the usual processes, the novel industrial product which forms the object of this invention, though well known, has heretofore not been recognized as possessing the tinctorial properties above referred to, and we have realized this discovery after effecting numerous experiments which we are constantly carrying on in the search after dye stuffs.

The tree under consideration is commonly known by the name of retama and is classified in botany under the name of *Bulnesia retama zygophyllaceæ*.

The bark, wood, roots and leaves of the said tree possess about the same tinctorial properties and are equally adapted for the extraction of the said product. For preparing the same, several of the well known chemical processes may successfully be employed, the novelty of this invention not being affected by such variation, as such novelty exclusively resides in the discovery of the aforesaid properties of the said tree, evidenced by the new industrial product thereby obtained.

Up to this date no mordant or coloring product extracted from the above mentioned tree has been known, nor have its tinctorial properties been adopted for industrial purposes.

The process used for obtaining the said product may be said to substantially consist, by way of example, in the extraction of the product of all the parts of the retama tree by decoction, precipitation and reduction of the foreign matters by ammonia and evaporation.

One of the processes which we employ and which has yielded satisfactory results, consists in reducing to sawdust all or some of the parts of the said tree, macerating the saw dust during a period of about 2 hours in water heated to a temperature of 60°–70° C., and finally concentrating the solution by evaporation or under vacuum.

We claim:

1. A coloring material comprising tinctorial matter of *Bulnesia retama zygophyllaceæ*, having both coloring and mordanting properties.

2. A coloring material comprising a concentrated decoction of *Bulnesia retama zygophyllaceæ*.

3. The method of obtaining a yellow coloring material comprising forming a decoction of the tree *Bulnesia retama zygophyllaceæ*, precipitating the non-coloring material, and concentrating the solution.

RAFAEL HERRERA VEGAS.
MARCELINO HERRERA VEGAS.

Witnesses:
ANTONIO L. BELLA,
R. FORRAINZ.